(12) United States Patent
Bhorania et al.

(10) Patent No.: US 8,572,314 B2
(45) Date of Patent: Oct. 29, 2013

(54) DETERMINING AN IDENTIFICATION OF A DVD BASED ON A FORMAT OF THE DVD

(75) Inventors: Aayaz Bhorania, Redmond, WA (US); Kyunga Lee, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 12/330,533

(22) Filed: Dec. 9, 2008

(65) Prior Publication Data

US 2010/0142345 A1    Jun. 10, 2010

(51) Int. Cl.
  *G06F 12/00* (2006.01)
  *G06F 3/06* (2006.01)
  *G06F 7/04* (2006.01)
  *G11B 7/013* (2006.01)

(52) U.S. Cl.
  USPC .......................................... 711/112; 369/53.2

(58) Field of Classification Search
  USPC .......................................... 711/112; 369/53.2
  See application file for complete search history.

(56) References Cited

U.S. PATENT DOCUMENTS

| | | | |
|---|---|---|---|
| 6,034,925 A * | 3/2000 | Wehmeyer | 369/30.28 |
| 6,871,012 B1 * | 3/2005 | Evans | 386/244 |
| 7,136,866 B2 * | 11/2006 | Springer, Jr. et al. | 1/1 |
| 2005/0010604 A1 * | 1/2005 | Commons et al. | 707/104.1 |
| 2005/0036418 A1 | 2/2005 | Kim | |
| 2005/0185937 A1 | 8/2005 | Comer et al. | |
| 2006/0215522 A1 * | 9/2006 | Chen | 369/53.37 |
| 2007/0031113 A1 * | 2/2007 | Collar et al. | 386/95 |
| 2007/0133946 A1 * | 6/2007 | Braun et al. | 386/95 |
| 2007/0147614 A1 | 6/2007 | Kelly et al. | |
| 2008/0005802 A1 * | 1/2008 | Fierstein et al. | 726/27 |
| 2008/0040807 A1 * | 2/2008 | Lu et al. | 726/26 |
| 2008/0101604 A1 | 5/2008 | Kocher et al. | |
| 2008/0117791 A1 | 5/2008 | Wang et al. | |

FOREIGN PATENT DOCUMENTS

| | | |
|---|---|---|
| EP | 1204111 B1 | 5/2002 |
| WO | 2005026873 A2 | 3/2005 |

OTHER PUBLICATIONS

"DVD Identifier", Retrieved at <<http://www.supermediastore.com/dvd-identifier.html>>, Sep. 18, 2008, pp. 1-3.
Grundner, Alexander, "My Movies Adds HD-DVD & Blu-ray Library Support in 2.31 Release", Retrieved at <<http://www.ehomeupgrade.com/2007/07/09/my-movies-adds-hd-dvd-blu-ray-library-support-in-231-release/>>, Jul. 9, 2007, pp. 1-2.

* cited by examiner

*Primary Examiner* — Sanjiv Shah
*Assistant Examiner* — Glenn Gossage

(57) ABSTRACT

A system, method and computer-readable storage media for digital versatile disc (DVD) identification. Media content from a DVD can be accessed and a format of the media content can be identified. An identification for the media content can be determined based upon the format. A first DVD format may be identified by matching a sequence of symbols on a DVD to format data. Content stored on the DVD in a first location that is used to generate IDs for the first DVD format may be referenced, and the content hashed to generate an ID for the DVD. The first location can be identified by referencing ID processing data that also identified other locations used to generate IDs for different DVD formats. Portions of the media content that are accessed can include directory names, folder names, or file names.

3 Claims, 3 Drawing Sheets

DETERMINING AN IDENTIFICATION OF A DVD BASED ON A FORMAT OF THE DVD

BACKGROUND

In the present paradigm, digital versatile discs (DVDs) are the dominant medium for storing media content, such as movies. These existing or standard DVDs store media content utilizing a standardized format.

Users often desire to be presented with metadata about the content of their DVDs. For instance, if the user puts a DVD that contains the movie "The Longest Yard" in a DVD player, the user may want to know when the movie was produced and who the actors are. A technique exists for generating a unique identification (ID) from the media content of individual standard DVDs.

A new paradigm is evolving around high definition DVDs in several formats, yet standard DVDs remain in the marketplace. Specifically, many users have large standard DVD collections. Accordingly, consumer acceptance of the new DVD formats depends upon the availability of DVD-players that will handle multiple, and preferably all, available DVD formats. However, the existing technique for generating unique IDs from media content on a DVD does not address the possibility of multiple DVD formats. Thus, the ability to offer users the features that they have come to expect, such as related metadata cannot be realized. The present concepts offer solutions for determining unique IDs for various DVD formats that are not available with existing techniques.

SUMMARY

The described implementations relate to DVD identification. Tools can access media content from a DVD and identify a format of the media content. The tools can also determine a unique identification for the media content based upon the format.

In another implementation the tools can include a DVD format module configured to identify a format of a DVD, at least in part, by searching content of the DVD for identifying aspects. In one case, the DVD format module can search for identifying aspects in the form of a specific sequence of symbols that are unique to a particular DVD format. So, identification of the specific sequence of symbols can be utilized to identify the DVD format. This implementation can also include an identification module configured to determine a unique identification of the content by examining at least two portions of the content. The unique ID can identify the content and the DVD format.

The term "tool(s)" may, for instance, refer to device(s), system(s), method(s), computer-readable instructions (e.g., one or more computer-readable media having executable instructions), component(s), and/or module(s), as permitted by the context above and throughout the document. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent application pertains to identifying digital versatile discs (DVDs). Specifically, tools are described for identifying DVDs that work for multiple different DVD formats. From a functional perspective, one potential goal of the present implementations can be to consistently generate the same unique ID for a given DVD. For instance, when the present tools are applied to the DVD movie "The Unforgiven" the same unique ID should be generated every time. This unique ID can then be associated with metadata about the movie. This metadata can be accessed the next time the same DVD (i.e., a DVD having the same content) is played. The metadata can be presented to a viewer or used in another manner.

Note, that some implementations can identify a DVD format in the unique ID. Such configurations can generate the same unique ID each time a Blu-ray format DVD movie "The Unforgiven" is read. Similarly, a high-definition DVD (HD-DVD) format DVD movie of "The Unforgiven" should produce the same unique ID each time, but the unique ID for the Blu-ray format would be different than for the HD-DVD format. Another potential goal of the present tools is to avoid assigning the same unique ID to two different DVDs. For instance, the functionality would be diminished if the same unique ID was assigned to the movies "The Unforgiven" and "Splash" for example.

Figure 1:
FIG. 1 shows an example of DVD identification tools in accordance with some implementations of the present concepts.

FIG. 1 shows a DVD identification (ID) tool 100 that can function with existing and/or yet to be developed DVD formats. DVD ID tool 100 can access media content from a DVD at 102. For instance, the tool can read the DVD to obtain the media content or obtain the content from a device that read the DVD. The DVD ID tool can identify a format of the media content at 104. Identifying the format of the media content can also be thought of as identifying the format of the DVD. For instance, in one case the DVD ID tool can search for specific sequences of symbols in the content that can be indicative of a specific DVD format.

At 106, the DVD ID tool determines a unique identification (unique ID) of the DVD. In some cases, the unique ID can convey the format of the DVD. For example, a unique ID for a Blu-ray format DVD might start with "BR" whereas a unique ID for a HD-DVD format may start with "HD". The unique ID can be correlated to metadata associated with the DVD. So, for instance, the DVD ID tool 100 having determined the unique ID can access a database or datatable and obtain metadata associated with the DVD.

Exemplary System Architecture/Environments

Figure 2:
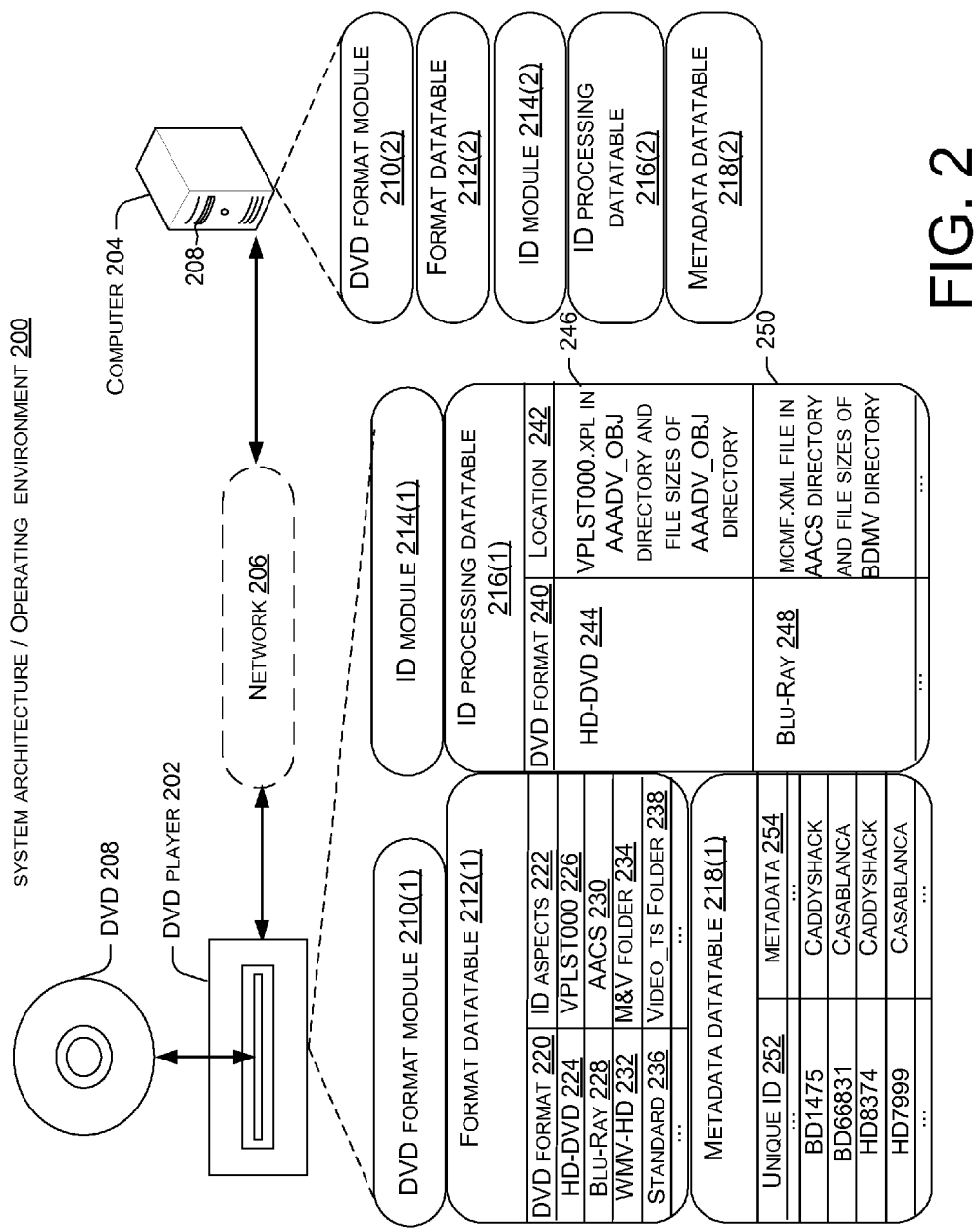
FIG. 2 illustrates an example of DVD identification tools in the form of systems in accordance with some implementations of the present concepts.

FIG. 2 shows an exemplary system architecture/operating environment 200 in which DVD identification concepts described above and below can be implemented on various devices. In this case, architecture 200 includes a DVD player 202 and a computer 204 that can be communicably coupled with one another via a network 206. DVD player 202 can be a stand-alone device that has its own display device (e.g., a portable DVD player), a set-top type player configured to output to a user's television (TV), or a component of a computer, such as a personal computer (PC), among others. For instance, computer 204 includes a DVD player 208. In other configurations, computer 204 may or may not include a DVD player.

In this case, DVD player 202 includes a DVD format module 210(1), a format datatable 212(1), an ID module 214(1), an ID processing datatable 216(1), and a metadata datatable 218(1). Alternatively or additionally, some or all of these components 210-218 can occur on computer 204 as designated by a "(2)" suffix.

As the name implies, DVD format module 210(1) is configured to identify a format of DVD 208. The DVD format module can examine the DVD's content for various parameters or aspects that can be indicative of a particular DVD format. In an illustrated example, the DVD format module can access format datatable 212(1) which can contain a listing of DVD formats at column 220 and corresponding identifying aspects at column 222. In some cases, identifying aspects can be symbols that are unique to a particular DVD format. So for instance, DVD format column 220 shows "HD-DVD" format 224 and identifying aspects column 222 shows corresponding symbols "VPLST000" at 226. Similarly, "Blu-ray format" is shown at 228 with identifying aspects listed as symbols "AACS" ("Advanced Access Content System") at 230, "WMV-HD" ("Windows Media High-Definition Video") is shown at 232 and identifying aspects "menu and video folder" ("M&V Folder") are shown at 234, and "standard" format and "video_ts folder" are shown at 236, 238, respectively.

In some cases, format datatable 212(1) can be generated in advance by examining a plurality of DVDs of a specific known format. For instance, tens or hundreds or thousands of Blu-ray DVDs may be examined to identify some parameter or aspect, such as a directory name that appears in all of the examined Blu-ray discs. For discussion purposes, assume that a hypothetical identified directory name is "ABC123". This directory name can be checked against discs of other formats. If the directory name "ABC123" occurs in all Blu-ray discs and no discs of other formats, then it is a good candidate for inclusion in format datatable 212(1). The same (or similar) techniques can be applied to each disc format to generate format datatable 212(1).

The DVD format module 210(1) can examine the contents of DVD 208 to identify a match with any of the symbols of column 222. If a match is identified, then the DVD format module can horizontally reference in the format datatable 212(1) to the corresponding DVD format and thereby identify the DVD's format. The DVD format module 210(1) can convey the identified format match to ID module 214(1).

ID module 214(1) can utilize the format information from the DVD format module 210(1) to determine a unique identification of the DVD 208. For example, the ID module 214(1) can examine at least two portions of the DVD content to determine the unique identification. Utilizing at least two portions can help ensure that truly unique IDs can be generated for any given existing or yet to be determined DVD format. The portions can be related to directories, folders, and/or files, among others. So for instance, the portions may relate to a title of a directory, folder, and/or file or content within the directory, folder, and/or file. In this case, the ID module utilizes information from ID processing datatable 216(1) in determining how to generate the unique ID.

ID processing table 216(1) includes a DVD format column 240 and a location column 242. A horizontal row in the ID processing table correlates an individual DVD format with a location in the DVD's content that can be processed to create a unique ID for the DVD. For instance, in relation to HD-DVDs 244 the table lists a VPLST000.xpl file in an AAAD-V_OBJ directory at 246. For Blu-ray format 248 a corresponding location is listed as MCMF.xml file in AACS directory and file sizes of BDMV directory at 250. For sake of brevity, other DVD formats are not specifically listed in ID processing datatable 216(1) but are described in another example below.

ID processing datatable 216(1) can be generated in a similar manner to the technique described above relative to the format datatable 212(1). As mentioned above, one goal of the present tools is to avoid assigning a unique ID to two different DVD discs. Thus, good candidates for inclusion on the ID processing table occur in essentially every DVD of a given format yet tend to be relatively highly differentiated from one DVD of the format to another. The locations listed in ID processing datatable 216(1) tend to be relatively highly differentiated from disc to disc. Thus, these locations are good candidates for processing to generate a unique ID that is, in fact, unique to that particular DVD. In comparison, locations that are relatively constant from disc to disc, especially discs of a given format, can increase a likelihood of the same unique ID being generated for different discs.

The ID module 214(1) can process content of the DVD at the location(s) obtained from the ID processing datatable 216(1) to generate the DVD's unique ID. In some cases, the processing can include hashing the content at the specified location to generate the unique ID.

The ID module 214(1) can further utilize the unique ID of the DVD to obtain corresponding metadata. For instance, the ID module can access a metadata datatable 218(1) that lists unique IDs and corresponding metadata.

Metadata datatable 218(1) includes a unique ID column 252 and a metadata column 254. So for instance, looking at unique ID column 252, a hypothetical unique ID of "BD1475" is referenced horizontally to the metadata column 254 which indicates that the corresponding title is "Caddyshack". Similarly, unique ID "BD66831" is referenced to the title "Casablanca". In the present example, if the ID module 214(1) generates unique ID BD1475, then the ID module can obtain corresponding metadata which in this case is the movie's title "Caddyshack". The ID module can then cause the title "Caddyshack" to be displayed for the user. The skilled artisan should recognize other types and/or uses of metadata.

The metadata datatable 218(1) may be generated at a previous time utilizing the techniques described above to generate unique IDs for known DVDs. Metadata for individual DVDs is then associated with the respective unique ID. For instance, metadata can relate to title, actors, producers, directors, year of production, etc.

The above description relates to a generally free-standing configuration where all of the described components occur on DVD player 202. Other implementations can employ a distributed configuration where some or all of the components occur only on computer 204. In such implementations, computer 204 can be thought of as performing a server role where data is transmitted back and forth between DVD player 202 and computer 204 and some or all of the processing is performed on the server. In other distributed configurations, DVD format module 210(1) and ID module 214(1) can occur on DVD player 202, while one or more of the datatables 212(2), 216(2) and/or 218(2) are maintained on computer 204. The DVD format module 210(1) and ID module 214(1) can access the datatables on computer 204 as needed. For example, the metadata datatable may not be maintained on DVD-player 202. Instead, when the DVD player generates a unique ID, the DVD player can access a remote metadata datatable, such as metadata datatable 218(2) over network 206 to obtain the corresponding metadata. This configuration can provide a centralized datatable of metadata that is easily updated as new DVDs are released.

Still another configuration can blend the stand alone and distributed configurations. For instance, metadata datatable 218(1) can be generated on another device, such as computer 204 and downloaded to DVD player 202. This can be a one-time event or can be re-occurring to update the datatable to reflect new releases.

Exemplary Methods

Figure 3:
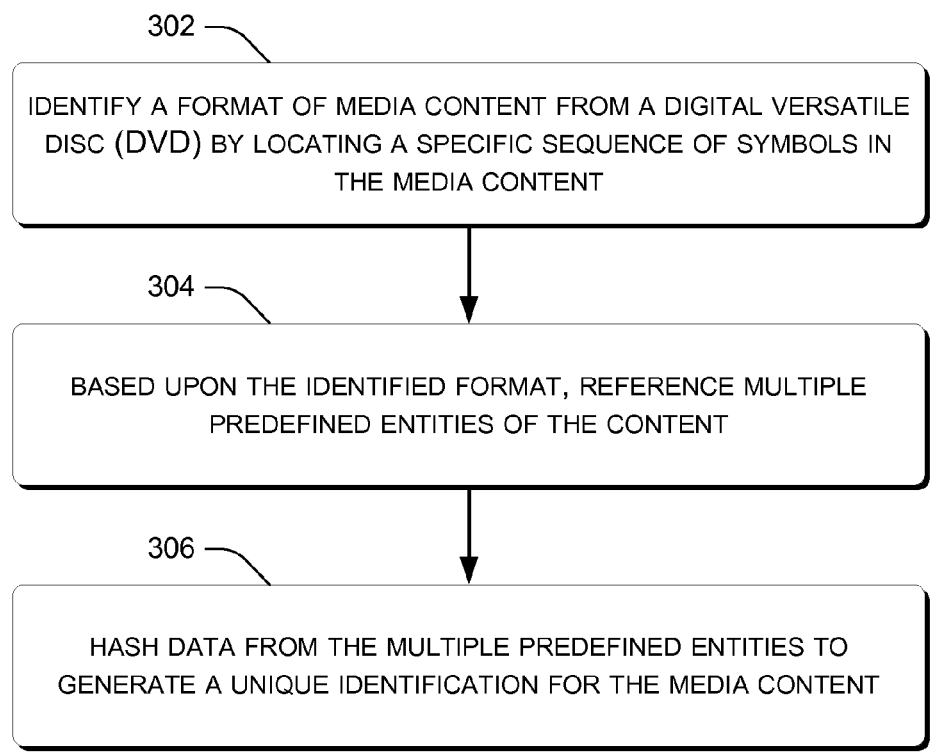
FIG. 3 is a flowchart of an example of DVD identification tools in the form of methods in accordance with some implementations of the present concepts.

FIG. 3 illustrates a flowchart of a method or technique 300 that is consistent with at least some implementations of the present concepts. The order in which the method 300 is described is not intended to be construed as a limitation, and any number of the described blocks can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device causes the computing device to perform the method.

The method identifies a format of media content from a digital versatile disc (DVD) by locating a specific sequence of symbols in the media content at block 302. For instance, the symbols can be letters, numerals and/or other symbols that tend to occur in DVDs of a particular format and tend not to occur in DVDs of other formats. For instance, the sequence of symbols can be a title of a directory or folder or file, among others.

Based upon the identified format, the method references multiple predefined entities of the content at block 304. For instance, the entities can be directories, folder, files, or other organizational entities of the DVD content. So, for example, the method can reference two directories, two folders, two files, a folder and a file, a directory and a file, etc. Referencing two entities avoids potential instances of assigning a unique ID to two different DVDs. Further, the present techniques can readily include future DVD formats. A specific implementation is described in detail below which generates a 25 character unique ID for each DVD. Of course, other implementations can generate unique IDs that have more or less characters so long as the selected number of characters can generate at least as many unique IDs as a number of DVDs that may exist now or in the future.

In the present example, the unique ID is a 25 character long string that contains alpha numeric characters. In this case, the first 2 characters will denote the type of disc. Table 1 below denotes several disc types. Other DVD formats can also be accommodated.

TABLE 1

| First 2 characters | Disc Type |
|---|---|
| HD | HD-DVD |
| BD | Blue-Ray |
| WH | WMV-HD |
| SD | Standard DVD |

The remaining 23 characters of this implementation are defined below.

HD-DVD

HD-DVD format is specified in Table 2.

TABLE 2

| Characters | Value |
|---|---|
| 1 to 2 | HD |
| 3 to 17 | 15 character hexadecimal value generated by hashing the contents of 'VPLST000.xpl' under 'ADV_OBJ' directory in the root directory of the disc and grabbing the first 15 characters. |
| 18 to 25 | 8 character hexadecimal value generated by hashing all the file sizes under the 'ADV_OBJ' directory in the root directory of the disc and grabbing the first 8 characters. |

Blu-Ray

If the Blu-ray disc has a 'mcmf.xml' file under 'ARCS' directory then the locations are defined in Table 3. If the Blu-ray disc does not have a 'mcmf.xml' file under 'AACS' directory then the locations are defined in Table 4.

TABLE 3

| Characters | Value |
|---|---|
| 1 to 2 | BD |
| 3 to 17 | 15 character hexadecimal value generated by hashing the contents of 'mcmf.xml' file under 'AACS' directory in the root directory of the disc and grabbing the first 15 characters. |
| 18 to 25 | 8 character hexadecimal value generated by hashing all the file sizes under the 'BDMV' directory in the root directory of the disc and grabbing the first 8 characters. |

TABLE 4

| Characters | Value |
|---|---|
| 1 to 2 | BD |
| 3 to 25 | 23 character hexadecimal value generated by hashing all the file sizes under the 'BDMV' directory in the root directory of the disc and grabbing the first 8 characters. |

WMV-HD

WMV-HD locations are described below in relation to Table 5.

TABLE 5

| Characters | Value |
|---|---|
| 1 to 2 | WH |
| 3 to 10 | 8 character hexadecimal value generated by hashing all the file sizes under the root directory of the disc and grabbing the first 8 characters. |
| 11 to 18 | 8 character hexadecimal value generated by hashing all the file sizes under the 'Menu' directory in the root directory of the disc and grabbing the first 8 characters. |

TABLE 5-continued

| Characters | Value |
|---|---|
| 19 to 25 | 7 character hexadecimal value generated by hashing all the file sizes under the 'Video' directory in the root directory of the disc and grabbing the first 7 characters. |

The method hashes data from the multiple predefined entities to generate a unique identification for the media content at block 306. In the above example, the data that is hashed is defined in the corresponding table. The skilled artisan should recognize other implementations that satisfy the present goals of consistently generating the same unique ID for a given DVD and avoiding assigning the same unique ID to two different DVDs. The present concepts, rather than being restrictive in nature and/or tied to a specific DVD format, are instead readily adaptable to many (and potentially all) existing and yet to be developed DVD formats.

CONCLUSION

Although techniques, methods, devices, systems, etc., pertaining to DVD identification scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method comprising:
    identifying a first DVD format of a DVD by locating a specific sequence of symbols on the DVD and matching the specific sequence of symbols on the DVD to format data, the format data comprising a plurality of digital versatile disc (DVD) formats and corresponding symbols that identify individual DVD formats including the first DVD format;
    referencing content stored on the DVD in a first location that is used to generate identifications for the first DVD format, the first location being identified by referencing identification (ID) processing data that also identifies other locations that are used to generate identifications for DVD formats other than the first DVD format; and
    hashing the content stored on the DVD in the first location to generate an identification for the DVD.

2. The method of claim 1, wherein the format data is a format datatable.

3. The method of claim 1, wherein the ID processing data is an ID processing datatable.

* * * * *